US 12,397,642 B2

(12) United States Patent
Miyoshi et al.

(10) Patent No.: US 12,397,642 B2
(45) Date of Patent: Aug. 26, 2025

(54) DISPLAY UNIT AND VEHICULAR DISPLAY DEVICE

(71) Applicant: Yazaki Corporation, Tokyo (JP)

(72) Inventors: Yuki Miyoshi, Makinohara (JP); Yasuhiro Katsumata, Makinohara (JP); Akira Yamanaka, Makinohara (JP); Hiroshi Sano, Makinohara (JP); Takuya Ishigami, Shimada (JP); Takayuki Mizushima, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 18/634,878

(22) Filed: Apr. 12, 2024

(65) Prior Publication Data

US 2024/0375515 A1 Nov. 14, 2024

(30) Foreign Application Priority Data

May 12, 2023 (JP) .................. 2023-079591

(51) Int. Cl.
| | |
|---|---|
| *B60K 35/231* | (2024.01) |
| *B60K 35/00* | (2024.01) |
| *B60K 35/23* | (2024.01) |
| *B60K 35/50* | (2024.01) |
| *G02B 27/01* | (2006.01) |

(Continued)

(52) U.S. Cl.
CPC ............ *B60K 35/231* (2024.01); *B60K 35/00* (2013.01); *B60K 35/23* (2024.01); *B60K 35/50* (2024.01); *B60K 2360/334* (2024.01); *B60K 2360/691* (2024.01); *B60K 2360/785* (2024.01); *B60K 2360/96* (2024.01); *G02B 27/01* (2013.01); *G02B 27/0149* (2013.01); *G02B 2027/015* (2013.01); *G02B 2027/0152* (2013.01); *G02B 2027/0161* (2013.01); *G02F 1/1333* (2013.01); *G02F 1/133608* (2013.01)

(58) Field of Classification Search
CPC ............ B60K 35/231; B60K 2360/334; B60K 2360/691; B60K 2360/785; B60K 35/00; B60K 35/23; B60K 35/50; B60K 2360/96; G02B 27/01; G02B 27/0149; G02B 2027/015; G02B 2027/0152; G02B 2027/0161; G02F 1/1333; G02F 1/133608

See application file for complete search history.

(56) References Cited

U.S. PATENT DOCUMENTS

| 11,175,501 B2 * | 11/2021 | Ogata .................. G02B 26/101 |
| 11,294,175 B2 * | 4/2022 | Lee ........................ B60K 35/60 |

(Continued)

FOREIGN PATENT DOCUMENTS

| CN | 218197927 U * | 1/2023 | ............ G02B 19/00 |
| JP | 2012-203176 A | 10/2012 | |

(Continued)

*Primary Examiner* — Douglas Wilson
(74) *Attorney, Agent, or Firm* — Banner & Witcoff, Ltd.

(57) ABSTRACT

There are a display unit and a vehicular display device. The display unit emits a display image including display light to be projected onto a projection target member provided in a vehicle. The display unit includes: a lens including a lens body and a first support portion protruding from an edge portion of the lens body; and a case that has a space configured to accommodate the first support portion and holds the lens by fitting the first support portion into the space.

5 Claims, 5 Drawing Sheets

(51) Int. Cl.
    *G02F 1/1333*    (2006.01)
    *G02F 1/13357*   (2006.01)

(56) References Cited

U.S. PATENT DOCUMENTS

| | | | |
|---|---|---|---|
| 11,846,776 B2* | 12/2023 | Misawa | B60K 35/00 |
| 12,043,116 B2* | 7/2024 | Akiyoshi | B60K 35/22 |
| 2012/0200476 A1* | 8/2012 | Kanamori | B60K 35/60 |
| | | | 345/7 |
| 2014/0022645 A1 | 1/2014 | Matsuura et al. | |
| 2017/0276936 A1 | 9/2017 | Shihaku et al. | |
| 2019/0219823 A1* | 7/2019 | Henon | B60K 35/00 |
| 2022/0326515 A1 | 10/2022 | Katsumata et al. | |

FOREIGN PATENT DOCUMENTS

| | | |
|---|---|---|
| JP | 2017-174542 A | 9/2017 |
| JP | 2022-069710 A | 5/2022 |
| JP | 2022-160754 A | 10/2022 |
| WO | 2021/132556 A1 | 7/2021 |

\* cited by examiner

DISPLAY UNIT AND VEHICULAR DISPLAY DEVICE

CROSS-REFERENCE TO RELATED APPLICATIONS

This application is based on and claims priority under 35 USC 119 from Japanese Patent Application No. 2023-079591 filed on May 12, 2023, the contents of which are incorporated herein by reference.

TECHNICAL FIELD

The present disclosure relates to a display unit and a vehicular display device.

BACKGROUND ART

In recent years, a vehicle such as an automated vehicle is equipped with a vehicular display device such as a head-up display (HUD). In the vehicular display device, for example, a display image displayed on a display unit is projected onto a windshield, a combiner, or the like via an optical system such as a reflection mirror, so that a driver visually recognizes the display image as a virtual image. See JP2022-160754A, for example.

In a vehicular display device in the related art, when a lens is assembled, positioning holes are respectively provided in two support portions of the lens, and the lens is assembled in a manner of fitting positioning pins provided in a case into the positioning holes. However, it is required to ensure an area corresponding to sizes of the positioning holes in the support portions of the lens, and as the area is ensured, the lens is increased in size.

SUMMARY OF INVENTION

The present disclosure provides a display unit and a vehicular display device that can be reduced in size.

According to an illustrative aspect of the present disclosure, a display unit emits a display image including display light to be projected onto a projection target member provided in a vehicle. the display unit includes: a lens including a lens body and a first support portion protruding from an edge portion of the lens body; and a case that has a space configured to accommodate the first support portion and holds the lens by fitting the first support portion into the space.

According to another illustrative aspect of the present disclosure, a vehicular display device includes: the above display unit; and an optical component configured to reflect the display light emitted from the display unit.

According to the present disclosure, the display unit and the vehicular display device can be reduced in size.

The present disclosure is briefly described above. Further, details of the present disclosure will be further clarified by reading modes for carrying out the disclosure described below with reference to the accompanying drawings.

DESCRIPTION OF EMBODIMENTS

Hereinafter, a display unit and a vehicular display device according to an embodiment of the present disclosure will be described with reference to the drawings.

Figure 1:
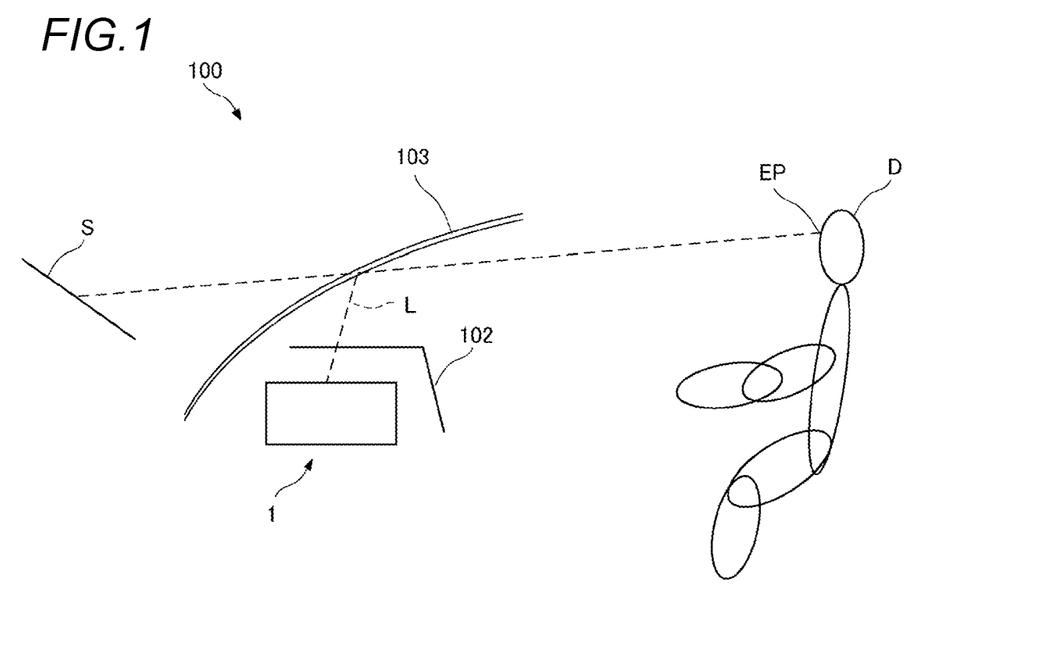
FIG. 1 is a schematic diagram illustrating a schematic configuration of a vehicle equipped with a vehicular display device.
Figure 2:
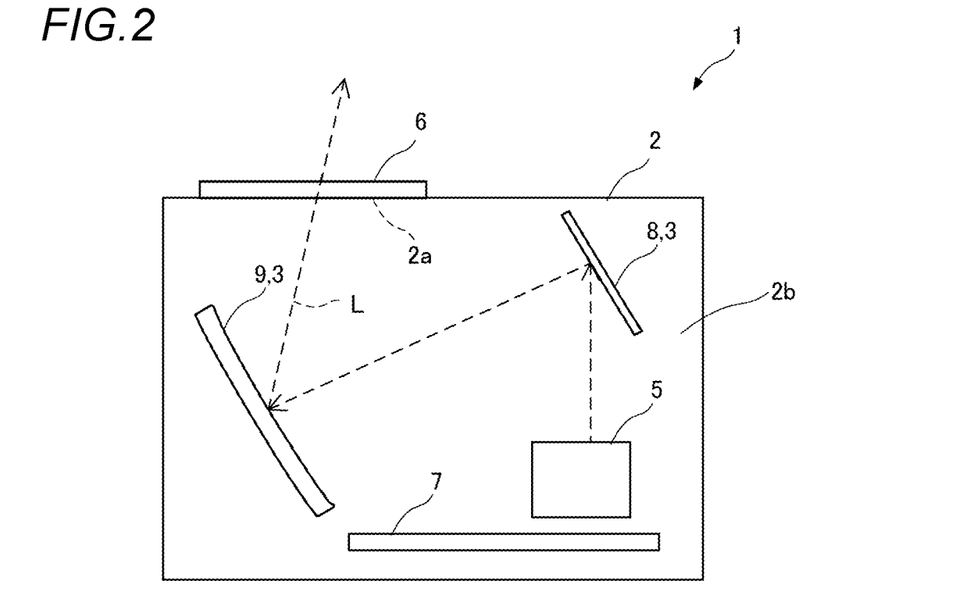
FIG. 2 is a schematic diagram illustrating a schematic configuration of the vehicular display device.

As illustrated in FIG. 1, a vehicular display device 1 including a display unit is a head-up display device mounted on a vehicle 100 such as an automated vehicle. The vehicular display device 1 is disposed inside an instrument panel 102 in the vehicle 100, and projects a display image onto a windshield 103 that is an example of a projection target member. Since the windshield 103 has a semi-transparent property of reflecting a part of incident light and transmitting remaining light, the windshield 103 reflects display light L emitted from the vehicular display device 1 as a display image toward an eye point EP of a driver D while transmitting foreground of the vehicle 100. The driver D is an occupant of the vehicle 100, a driver in particular, and recognizes the display image reflected by the windshield 103 as a virtual image S. The virtual image S is recognized by the driver D in front of the windshield 103. As illustrated in FIG. 2, the vehicular display device 1 according to the present embodiment includes a housing 2, two reflection mirrors 3, a backlight unit 5, and a control unit 7.

The housing 2 is formed of, for example, synthetic resin, and is fixed to a vehicle body (not illustrated). As illustrated in FIG. 2, the housing 2 accommodates and supports the backlight unit 5, the two reflection mirrors 3, and the control unit 7 in an internal space 2b. The housing 2 has an opening 2a through which the outside communicates with the internal space 2b. The opening 2a is provided in the housing 2 at a position facing the windshield 103, and is closed by a cover member 6. The display light L emitted from the backlight unit 5 and reflected by the two reflection mirrors 3 is transmitted through the cover member 6. The display light L transmitted through the cover member 6 travels toward the windshield 103.

The two reflection mirrors 3 are disposed on an optical path of the display light L from the backlight unit 5 to the windshield 103, and reflect the display light L emitted from the backlight unit 5 toward the windshield 103. The two reflection mirrors 3 include a plane mirror 8 serving as an example of an optical component and a concave mirror 9 serving as an example of an optical component.

The plane mirror 8 has a reflection surface formed as a plane and is disposed at a position facing the backlight unit 5. The reflection surface of the plane mirror 8 totally reflects the display light L emitted from the backlight unit 5 toward the concave mirror 9.

The concave mirror 9 has a reflection surface formed as a concave curved surface and is disposed at a position facing the plane mirror 8. The concave mirror 9 totally reflects the display light L reflected by the plane mirror 8 toward the windshield 103 via the cover member 6. For example, the concave mirror 9 has a function of a magnifying mirror. The concave mirror 9 enlarges and reflects a display image represented by the display light L reflected by the concave mirror 9 such that the display image is relatively larger than a display image represented by the display light L before being reflected by the concave mirror 9.

The backlight unit 5 is an example of a display unit, and emits, as the display light L, a display image to be visually recognized as the virtual image S by the driver D of the vehicle 100. The backlight unit 5 includes a display panel 55 (see FIG. 3) and a light source (not illustrated) in a housing having an opening. The backlight unit 5 may include a component such as a condenser lens and a deflector lens. The backlight unit 5 is a display unit that emits, as display light, a display image to be projected onto the windshield 103 that is a projection target member.

The control unit 7 is connected to the backlight unit 5 and controls the backlight unit 5. The control unit 7 includes, for example, an IC chip mounted on a substrate, and is driven by electric power obtained from a battery mounted on the vehicle 100.

Figure 3:
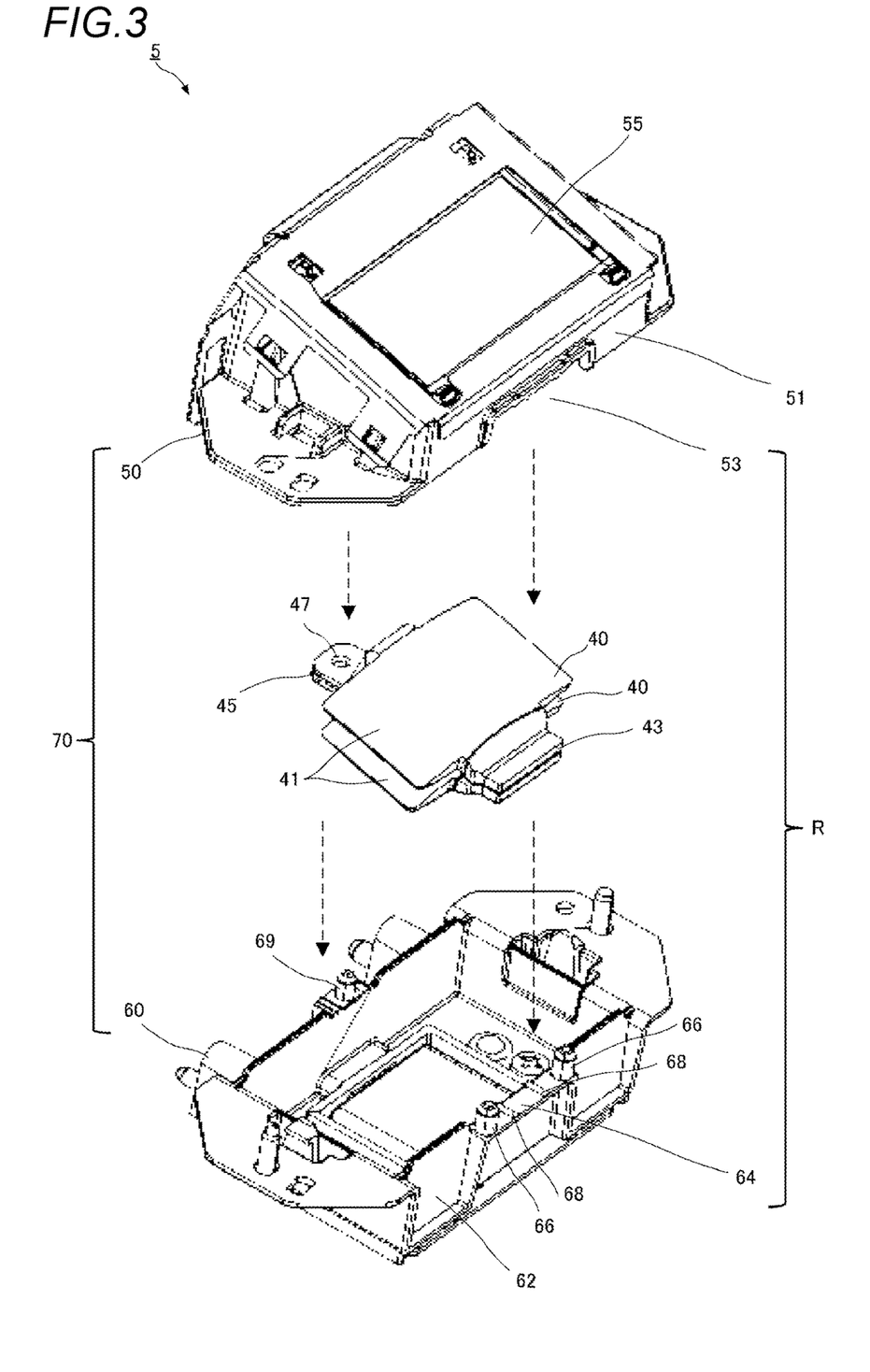
FIG. 3 is an exploded perspective view illustrating a backlight unit according to an embodiment.

As illustrated in FIG. 3, the backlight unit 5 includes lenses 40 and a case 70 that accommodates the lenses 40. The lens 40 is formed of a material such as glass and transparent resin, and plays a role of refracting and deflecting light emitted from a light source (not illustrated) toward the display panel 55 provided on an upper case 50 to be described later.

The lens 40 includes a lens body 41, a first support portion 43, and a second support portion 45. The lens body 41 has a main lens function, has a rectangular shape when viewed in an optical axis direction, and deflects light incident from a light source (not illustrated). The first support portion 43 is a plate-shaped member that is an edge portion of the lens body 41 and protrudes from one side. The second support portion 45 is a tab-shaped member provided on the other side opposite to the one side where the first support portion 43 is provided, and has a positioning hole 47.

The case 70 includes the upper case 50 serving as a first case and a lower case 60 serving as a second case. The case 70 is completed by combining the upper case 50 and the lower case 60, and the lenses 40 are accommodated in the case 70.

The upper case 50 has four side walls and is implemented in a lid shape. A first side wall 51 which is one of the four side walls has an opening 53 formed by cutting a part of the first side wall 51. The opening 53 defines a support portion fitting space R to be described later.

The lower case 60 also has four side walls, and is formed in a box shape. A second side wall 62 which is one of the four side walls has a placement surface 64 extending outward from an upper end portion of the second side wall 62. A pair of positioning pins 66 protruding from the placement surface 64 toward the upper case 50 are provided at both ends of the placement surface 64. Two ribs 68 are provided between the pair of positioning pins 66 on the placement surface 64. Further, a positioning pin 69 is provided on a side wall facing the second side wall 62.

The lenses 40 are disposed inside the lower case 60 when assembling the backlight unit 5. At this time, the first support portion 43 of the lens 40 is placed on the placement surface 64 of the lower case 60, and the pair of positioning pins 66 function as a pair of position regulating portions for regulating a position of the first support portion 43 on the placement surface 64.

Further, the positioning pin 69 of the lower case 60 is inserted into the positioning hole 47 formed in the second support portion 45 of the lens 40. The positioning pin 69 functions as a positioning portion that positions the lens 40.

Thereafter, the upper case 50 covers the lower case 60 and the lenses 40. The opening 53 is provided in the first side wall 51 of the upper case 50. During assembly, the opening 53 is formed at a position facing the placement surface 64 of the lower case 60. Therefore, the case 70 completed by combining the upper case 50 and the lower case 60 has a space capable of accommodating the first support portion 43 of the lens 40, that is, the support portion fitting space R. The case 70 can hold the lens 40 by fitting the first support portion 43 into the support portion fitting space R.

As described above, according to the backlight unit 5 in the present embodiment, the lens 40 is positioned and held in the case 70 by fitting the first support portion 43 into the support portion fitting space R of the case 70. Accordingly, as compared with a case where positioning holes are provided in support portions of the lens 40 and the lens 40 is assembled in a manner of fitting positioning pins provided in the case 70 into the positioning holes, an area of a support portion can be reduced by a size of a positioning hole. Accordingly, since it is not necessary to ensure this area, the lens 40 can be reduced in size and the backlight unit 5 can be reduced in size.

Since no positioning hole is provided in the support portion (the first support portion 43) of the lens 40, formability of the lens 40 is improved, and the degree of freedom in designing a shape of the lens is increased. This makes it easy to adopt an optimum shape for improving visibility. Further, it is possible to achieve a Fresnel lens which cannot be achieved in a lens in the related art in which positioning holes are provided in support portions. Therefore, the lens 40 can be further reduced in size and thickness by adopting the Fresnel lens.

In the present embodiment, the case 70 includes the upper case 50 and the lower case 60, and the support portion fitting space R is defined by combining the upper case 50 and the lower case 60. Accordingly, the first support portion 43 of the lens 40 is positioned between the upper case 50 and the lower case 60, and the case 70 sandwiches the first support portion 43 in the support portion fitting space R by combining the upper case 50 and the lower case 60. Accordingly, the lens 40 can be easily assembled to the case 70.

In particular, the support portion fitting space R is defined by the opening portion 53, the placement surface 64, and the pair of positioning pins 66 in a state where the upper case 50 and the lower case 60 are combined. With such a configuration, since a position of the first support portion 43 placed on the placement surface 64 is regulated by the pair of positioning pins 66, assembling accuracy of the lens 40 to the case 70 can be improved. In particular, the pair of positioning pins 66 can regulate a position of a side end portion of the first support portion 43 and regulate a lateral movement of the first support portion 43.

The lower case 60 is provided with the positioning pin 69 to be inserted into the positioning hole 47 of the lens 40. Accordingly, the upper case 50 and the lower case 60 are combined in a state where the first support portion 43 on one side of the rectangular lens body 41 is fitted into the support portion fitting space R and the positioning pin 69 is inserted into the positioning hole 47 in the second support portion 45 on the other side. Therefore, the lens 40 can be reduced in size as compared with a case where positioning holes are provided in support portions on one side and the other side of the lens body 41. The positioning pin 69 serving as a positioning portion may be provided not only in the lower case 60, but also in either the upper case 50 or the lower case 60.

Further, the two ribs 68 provided on the placement surface 64 abut against a lower face of the first support portion 43 and stably hold the first support portion 43.

Figure 4:
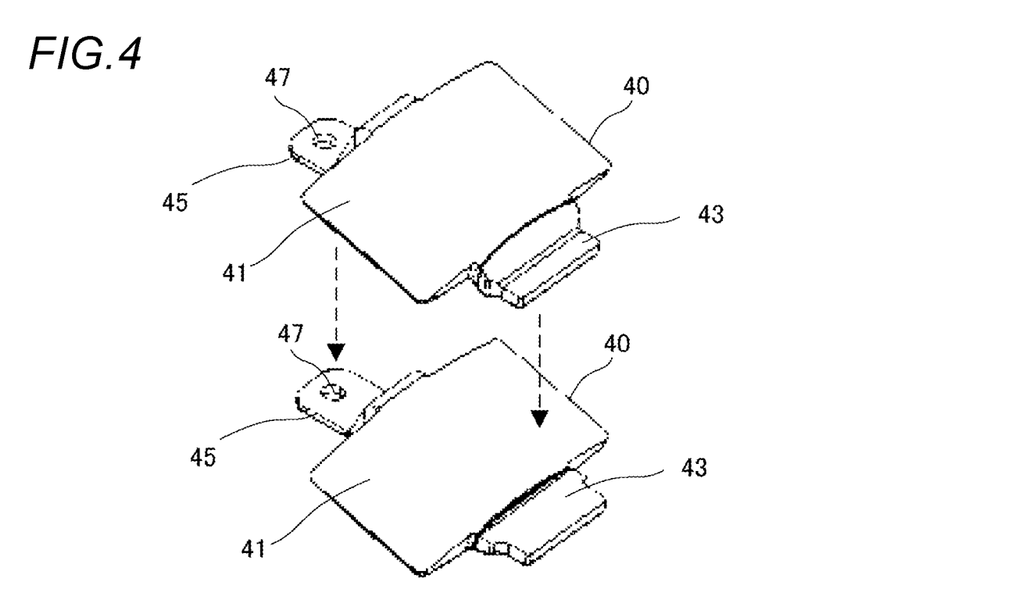
FIG. 4 is an exploded perspective view illustrating lenses.
Figure 5:
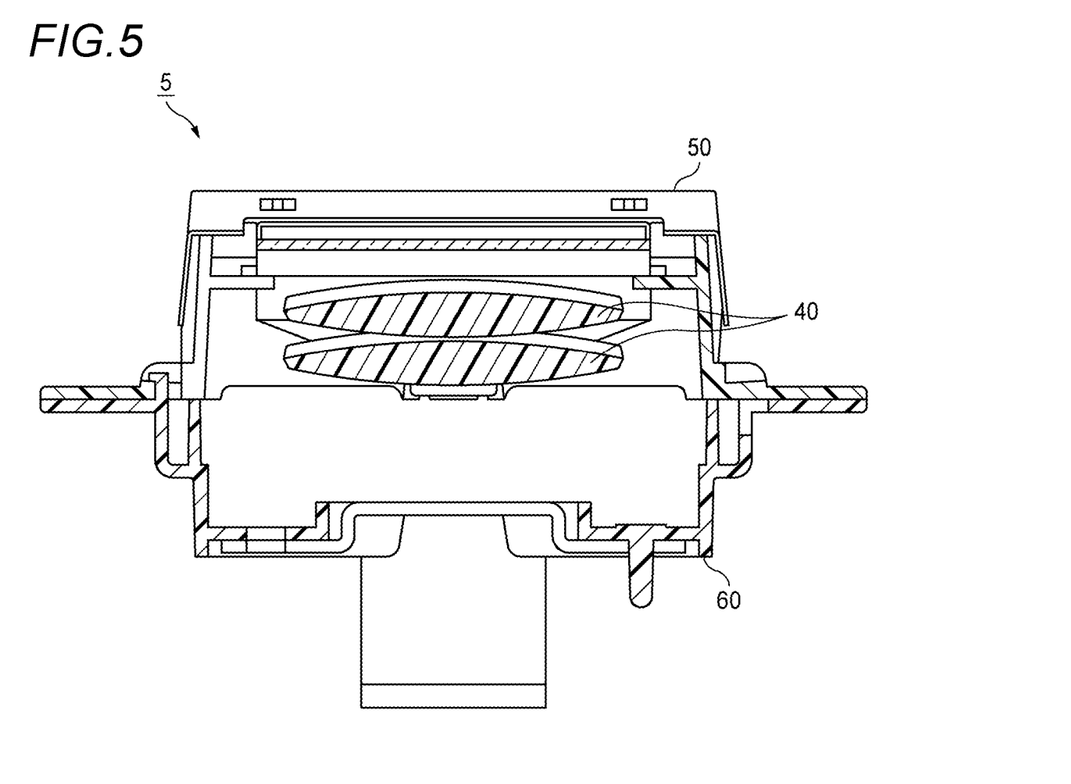
FIG. 5 is a cross-sectional view illustrating the backlight unit according to the embodiment.

As illustrated in FIGS. 4 and 5, two lenses 40 are used in the backlight unit 5 in the present embodiment. The two lenses 40 are laminated, the first support portion 43 of the upper lens 40 and the first support portion 43 of the lower lens 40 are integrated, and the second support portion 45 of the upper lens 40 and the second support portion 45 of the lower lens 40 are integrated. When two or more lenses 40 are used, for example, a magnification ratio can be increased, and thus improvement in visibility can be expected.

When a plurality of lenses 40 are used to improve visibility, the backlight unit 5 may be increased in size. According to such a configuration, since the lens 40 can be reduced in size, a plurality of lenses 40 can be used without increasing a size of a case of the backlight unit 5, and display quality of the vehicular display device 1 can be improved. Of course, only one lens 40 may be used.

As illustrated in FIG. 2, the vehicular display device 1 includes at least the backlight unit 5 according to the present embodiment and optical components that reflect display light emitted from the backlight unit 5, that is, the plane mirror 8 and the concave mirror 9. Accordingly, the vehicular display device 1 can be reduced in size and display quality can be improved.

Figure 6:
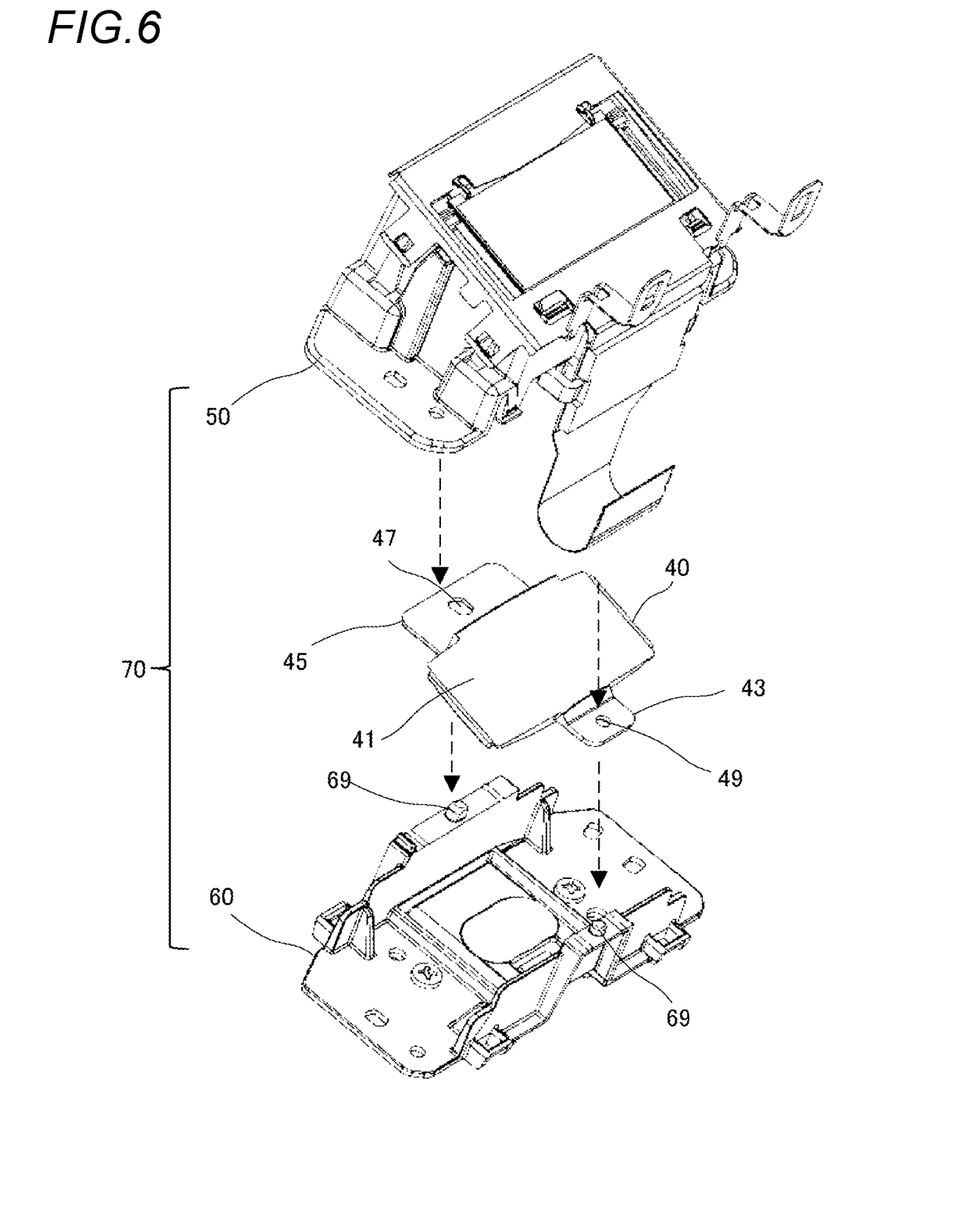
FIG. 6 is an exploded perspective view illustrating a backlight unit in the related art.
Figure 7:
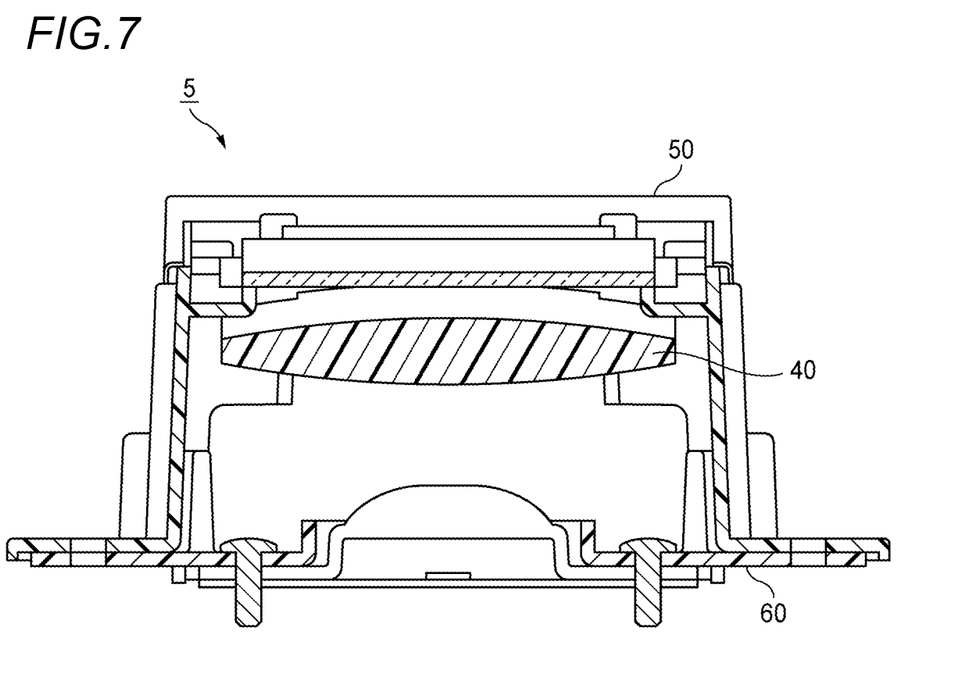
FIG. 7 is a cross-sectional view illustrating the backlight unit in the related art.

As illustrated in FIGS. 6 and 7, in the backlight unit 5 in the related art, a positioning hole 49 is also provided in the first support portion 43 of the lens 40. Two positioning pins 69 are provided in the lower case 60, and both of the two positioning pins 69 are respectively inserted into the positioning hole 49 of the first support portion 43 and the positioning hole 47 of the second support portion 45. In such a configuration, the lens 40 is held by the case 70.

In the example in the related art, since the positioning hole 49 is also provided in the first support portion 43, the first support portion 43 is increased in size, which leads to an increase in size of the lens 40 and the backlight unit 5. In contrast, in the vehicular display device 1 according to the embodiment, the lens 40 is reduced in size as described above, and thus the backlight unit 5 can be reduced in size.

The present disclosure is not limited to the embodiments described above, and various modifications can be adopted within the scope of the present disclosure. For example, the present disclosure is not limited to the embodiments described above, and modifications, improvements, and the like can be appropriately made. In addition, materials, shapes, sizes, numbers, arrangement positions and the like of components in the embodiments described above are freely selected and are not limited as long as the present disclosure can be implemented.

Although the first support portion 43 to be fitted into the support portion fitting space R is provided on one side of the lens body 41, and the second support portion 45 having the positioning hole 47 is provided on the other side of the lens body 41 in the embodiment described above, the present disclosure is not limited thereto. The lens 40 may have a support portion that does not have a positioning hole and is to be fitted into a space provided in the case 70 on one side as well as on the other side of the lens body 41.

Although an example in which the case 70 is completed by combining the upper case 50 and the lower case 60 and the lens 40 is accommodated in the case 70 is described in the embodiment described above, the present disclosure is not limited thereto. The lens may be accommodated inside a case in which an upper case and a lower case are integrated. In this case, for example, a space capable of accommodating a first support portion of the lens is provided in a part of the integrated case, and an opening through which the lens can be inserted is provided in a surface opposite to a surface in which the space is provided. According to such a configuration, the lens can be held in the case by inserting the lens into the case through the opening and inserting the first support portion into the space.

Here, features of embodiments of the display unit and the vehicular display device according to the present disclosure described above are briefly summarized and listed in the following aspects 1 to 5.

According to an aspect 1 of the present disclosure, a display unit (5) emits a display image including display light to be projected onto a projection target member (103) provided in a vehicle (100). The display unit includes: a lens (40) including a lens body (41) and a first support portion (43) protruding from an edge portion of the lens body; and a case (70) that has a space (R) configured to accommodate the first support portion and holds the lens by fitting the first support portion into the space.

According to the display unit having the configuration of the aspect 1, the lens is positioned and held in the case by fitting the first support portion into the space of the case. Accordingly, as compared with a case where positioning holes are provided in support portions of the lens and the lens is assembled in a manner of fitting positioning pins provided in the case into the positioning holes, an area of a support portion can be reduced by a size of a positioning hole. Therefore, it is not necessary to ensure this area, the lens can be reduced in size, and thus the display unit can be reduced in size.

Since no positioning hole is provided in the support portion (the first support portion) of the lens, formability of the lens is improved, and the degree of freedom in designing a shape of the lens is increased. This makes it easy to adopt an optimum shape for improving visibility. Further, it is possible to achieve a Fresnel lens which cannot be achieved in a lens in the related art in which positioning holes are provided in support portions. Therefore, the lens can be further reduced in size and thickness by adopting the Fresnel lens.

When a plurality of lenses are used to improve visibility, the display unit may be increased in size, whereas according to the above configuration, since the lens can be reduced in size, a plurality of lenses can be used without increasing the size of the display unit, and display quality of the vehicular display device can be improved.

According to an aspect 2 of the present disclosure, in the aspect 1, the case includes a first case (50) and a second case (60), and the space is defined by combining the first case and the second case.

According to the display unit having the configuration of the aspect 2, the first support portion of the lens is positioned between the first case and the second case, the case sandwiches the first support portion in the space by combining the first case and the second case, so that the lens can be easily assembled to the case.

According to an aspect 3 of the present disclosure, in the aspect 2, the first case has a first side wall (51) having an opening (53). The second case has a second side wall (62) provided with a placement surface (64) on which the first support portion is placed. The placement surface is provided with a pair of position regulating portions (66) configured to regulate a position of the first support portion on the placement surface. The space is defined by the opening, the placement surface, and the pair of position regulating portions in a state where the first case and the second case are combined.

According to the display unit having the configuration of the aspect 3, since a position of the first support portion placed on the placement surface is regulated by the pair of position regulating portions, assembling accuracy of the lens to the case can be improved.

According to an aspect 4 of the present disclosure, in the aspect 2, the lens body deflects light incident from a light source and has a rectangular shape when viewed in an optical axis direction. The first support portion is provided on one side of the lens body. A second support portion (45) having a positioning hole (47) is provided on the other side of the lens body opposite to the one side. A positioning portion (69) to be inserted into the positioning hole is provided in either the first case or the second case.

According to the display unit having the configuration of the aspect 4, the first case and the second case are combined in a state where the first support portion on one side of the rectangular lens body is fitted into the space and the positioning portion is inserted into the positioning hole in the second support portion on the other side. Therefore, the lens can be reduced in size as compared with a case where positioning holes are provided in support portions on one side and the other side of the lens body.

According to an aspect 5 of the present disclosure, a vehicular display device (1) includes: the display unit according to any one of the aspects 1 to 4; and an optical component (8, 9) configured to reflect the display light emitted from the display unit.

According to the vehicular display device having the configuration of the aspect 5, the vehicular display device can be reduced in size and display quality can be improved.

What is claimed is:

1. A display unit that emits a display image including display light to be projected onto a projection target member provided in a vehicle, the display unit comprising:
    a lens including a lens body and a first support portion protruding from an edge portion of the lens body;
    a case that has a space configured to accommodate the first support portion and holds the lens by fitting the first support portion into the space, the case including:
    a first case including a first side wall having an opening; and
    a second case including a second side wall provided with a placement surface on which the first support portion is placed, the placement surface being provided with a pair of position regulating portions configured to regulate a position of the first support portion on the placement surface, the first support portion being disposed in the space between the pair of position regulating portions,
    wherein the space is defined by the opening, the placement surface, and the pair of position regulating portions in a state where the first case and the second case are combined.

2. A vehicular display device comprising:
    the display unit according to claim 1; and
    an optical component configured to reflect the display light emitted from the display unit.

3. A display unit that emits a display image including display light to be projected onto a projection target member provided in a vehicle, the display unit comprising:
    a lens including a lens body and a first support portion protruding from an edge portion of the lens body;
    a case that has a space configured to accommodate the first support portion and holds the lens by fitting the first support portion into the space, the case including:
    a first case including a first side wall having an opening; and
    a second case including a second side wall provided with a placement surface on which the first support portion is placed, the placement surface being provided with a pair of position regulating portions configured to regulate a position of the first support portion on the placement surface, the first support portion being disposed in the space between the pair of position regulating portions,
    wherein
    the space is defined by combining the first case and the second case,
    the lens body deflects light incident from a light source and has a rectangular shape when viewed in an optical axis direction,
    the first support portion is provided on one side of the lens body, and
    a second support portion having a positioning hole is provided on the other side of the lens body opposite to the one side.

4. The display unit according to claim 3, wherein a positioning portion to be inserted into the positioning hole is provided in either the first case or the second case.

5. A vehicular display device comprising:
    the display unit according to claim 3; and
    an optical component configured to reflect the display light emitted from the display unit.

\* \* \* \* \*